US006290352B1

(12) United States Patent
Marumoto et al.

(10) Patent No.: US 6,290,352 B1
(45) Date of Patent: Sep. 18, 2001

(54) INK DISCHARGE DENSITY SETTING METHOD, COLOR FILTER MANUFACTURING METHOD, COLOR FILTER, DISPLAY DEVICE, AND APPARATUS HAVING DISPLAY DEVICE

(75) Inventors: Yoshitomo Marumoto; Makoto Akahira, both of Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/039,223

(22) Filed: Mar. 16, 1998

(30) Foreign Application Priority Data

Mar. 17, 1997 (JP) .................................... 9-063038
Mar. 4, 1998 (JP) .................................. 10-052080

(51) Int. Cl.[7] .................................................. B41J 3/407
(52) U.S. Cl. .......................................... 347/106; 347/102
(58) Field of Search ................................. 347/19, 43, 15, 347/106

(56) References Cited

U.S. PATENT DOCUMENTS

| 4,313,124 | 1/1982 | Hara ................................ 346/140 R |
| 4,345,262 | 8/1982 | Shirato et al. .................... 346/140 R |
| 4,459,600 | 7/1984 | Sato et al. ........................ 346/140 R |
| 4,463,359 | 7/1984 | Ayata et al. ........................... 346/1.1 |
| 4,558,333 | 12/1985 | Sugitani et al. ................. 346/140 R |
| 4,692,773 | 9/1987 | Saito et al. ............................ 346/1.1 |
| 4,723,129 | 2/1988 | Endo et al. ............................ 346/1.1 |
| 4,740,796 | 4/1988 | Endo et al. ............................ 346/1.1 |
| 5,130,726 | * 7/1992 | Fukushima et al. ................ 347/102 |
| 5,313,573 | * 5/1994 | Takahama ............................. 345/467 |
| 5,384,859 | * 1/1995 | Bolza-Schunemann et al. ..... 347/19 |
| 5,798,771 | * 8/1998 | Nishii et al. ............................... 347/7 |
| 5,948,575 | * 9/1999 | Roosen ..................................... 430/7 |
| 5,948,576 | * 9/1999 | Shirota et al. ........................... 430/7 |
| 5,989,757 | * 11/1999 | Satoi ......................................... 430/7 |

FOREIGN PATENT DOCUMENTS

| 0791 841 A2 | * 8/1997 | (EP) ................................ G02B/5/20 |
| 54-56847 | 5/1979 | (JP) . |
| 58-22178 | 2/1983 | (JP) . |
| 59-19166 | 1/1984 | (JP) . |
| 59-75205 | 4/1984 | (JP) . |
| 59-123670 | 7/1984 | (JP) . |
| 59-138461 | 8/1984 | (JP) . |
| 60-71260 | 4/1985 | (JP) . |
| 63-235901 | 9/1988 | (JP) . |
| 1-217320 | 8/1989 | (JP) . |
| 4-163178 | 6/1992 | (JP) . |
| 8-230314 | 9/1996 | (JP) . |
| 8-271724 | 10/1996 | (JP) . |
| 9-62371 | 3/1997 | (JP) . |

\* cited by examiner

*Primary Examiner*—John Barlow
*Assistant Examiner*—Manish S. Shah
(74) *Attorney, Agent, or Firm*—Fitzpatrick, Cella, Harper & Scinto

(57) ABSTRACT

It is an object of the present invention to provide an ink discharge density setting method which allows easy setting of discharge densities. To achieve this object, there is provided an ink discharge density setting method including the line pattern formation step of forming a line pattern on a recording medium by discharging an ink from at least one ink discharging nozzle of said ink-jet head onto the recording medium at an ink discharge density M, the detection step of detecting a color density Dn of the line pattern, and the calculation step of, when a color density of a pixel which is required for the color filter is represented by D, calculating a discharge density Mn of an ink to be discharged onto the color filter substrate on the basis of the predetermined ink discharge density M, the color density Dn of the line pattern, and the required pixel color density D.

19 Claims, 18 Drawing Sheets

LINE PATTERNS
(ALL PATTERNS ARE DRAW AT PREDETERMINED DOT DENSITY)

NOZZLE

IJH

FIG. 14

| PIXEL ARRAY NUMBER | 1 | 2 | 3 |
|---|---|---|---|
| USE NOZZLE NUMBER | 1, 2, 5 | 2, 3, 6 | 3, 4, 7 |
| $K_n$ | 23.75461 | 24.88032 | 22.05032 |
| $b_n$ | 0.0124 | 0.013379 | 0.021725 |
| TARGET ABSORBANCE D | 0.25 | 0.25 | 0.25 |
| $M_n$ PIXEL CORRECTION DOT DENSITY | 1/99.9771 | 1/105.1484 | 1/96.59553 |

FIG. 15

| | n | n+1 | n+2 |
|---|---|---|---|
| PIXEL ARRAY NUMBER | | | |
| USE NOZZLE NUMBER | x | x+1 | x+2 |
| | x+1 | x+2 | x+3 |
| | x+4 | x+5 | x+6 |
| PIXEL CORRECTION INK DOT DENSITY | Mn | Mn+1 | Mn+2 |
| USE NOZZLE NUMBER FOR COLORING COLOR FILTER  SCANNING 1 | x | x+1 | x+2 |
| SCANNING 2 | x+1 | x+2 | x+3 |
| SCANNING 3 | x+4 | x+5 | x+6 |
| INK DISCHARGE PITCH FOR NOZZLE USED FOR COLORING  SCANNING 1 | 1/Mn | 1/Mn+1 | 1/Mn+2 |
| SCANNING 2 | 1/Mn | 1/Mn+1 | 1/Mn+2 |
| SCANNING 3 | 1/Mn | 1/Mn+1 | 1/Mn+2 |

FIG. 19

| | | | | |
|---|---|---|---|---|
| PIXEL ARRAY NUMBER | 1 | 2 | 3 | |
| USE NOZZLE NUMBER | 1, 2, 3 | 2, 3, 4 | 3, 4, 5 | |
| $K_n$ | 23.75461 | 24.88032 | 22.05032 | DRAWING |
| $b_n$ | 0.0124 | 0.013379 | 0.021725 | CONDITIONS |
| TARGET ABSORBANCE | 0.25 | 0.25 | 0.25 | |
| $M_n$ (1/μm) | 1/99.9771 | 1/105.1484 | 1/96.59553 | |
| MEASUREMENT ABSORBANCE VALUE | 0.250 | 0.260 | 0.250 | MEASUREMENT VALUE |
| $K'_n$ | — | 25.9318 | — | |
| $b_n$ | — | 0.013379 | — | |
| TARGET ABSORBANCE | — | 0.25 | — | RE-SETTING |
| $M'_n$ (1/μm) | — | 1/109.5921 | — | |

INK DISCHARGE DENSITY SETTING METHOD, COLOR FILTER MANUFACTURING METHOD, COLOR FILTER, DISPLAY DEVICE, AND APPARATUS HAVING DISPLAY DEVICE

BACKGROUND OF THE INVENTION

1. Field of the Invention

The present invention relates to a color filter manufacturing method of manufacturing a color filter by discharging inks onto a substrate using ink-jet heads and coloring each pixel of the color filter with the discharged inks, an ink discharge density setting method in the manufacturing method, a color filter, a display device, and an apparatus having the display device.

2. Related Background Art

With recent advances in personal computers, especially portable personal computers, demands tend to arise for liquid crystal displays, especially color liquid crystal displays. However, in order to further popularize the use of liquid crystal displays, a reduction in cost must be achieved. Especially, it is required to reduce the cost of a color filter which occupies a large proportion of the total cost. Various methods have been tried to satisfy the required characteristics of color filters while meeting the above requirements. However, any method capable of satisfying all the requirements has not been established. The respective methods will be described below.

The first method is a pigment dispersion method. In this method, a pigment-dispersed photosensitive resin layer is formed on a substrate and patterned into a single-color pattern. This process is repeated three times to obtain R, G, and B color filter layers.

The second method is a dyeing method. In the dyeing method, a glass substrate is coated with a water-soluble polymer material as a dye able material, and the coating is patterned into a desired shape by a photolithography process. The obtained pattern is dipped in a dye bath to obtain a colored pattern. This process is repeated three times to form R, G, and B color filter layers.

The third method is an electrodeposition method. In this method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G, and B color filter layers. Finally, these layers are calcined.

The fourth method is a print method. In this method, a pigment is dispersed in a thermosetting resin, and a print operation is repeated three times to form R, G, and B coatings separately. Colored layers are then formed by thermosetting the resins. In either of the above methods, a protective layer is generally formed on the colored layers.

The point common to these methods is that the same process must be repeated three times to obtain layers colored in three colors, i.e., R, G, and B. This causes an increase in cost. In addition, as the number of processes increases, the yield decreases. In the electrodeposition method, limitations are imposed on pattern shapes which can be formed. For this reason, with the existing techniques, this method cannot be applied to TFTs. In the print method, a pattern with a fine pitch cannot be formed because of poor resolution and poor evenness.

In order to eliminate these drawbacks, methods of manufacturing color filters by an ink-jet system are disclosed in Japanese Patent Laid-Open Nos. 59-75205, 63-235901, and 1-217320. In these methods, inks containing coloring materials of three colors, i.e., R, G, and B, are sprayed on a transparent substrate by an ink-jet system, and the respective inks are dried to form colored image portions. In such an ink-jet system, R, G, and B pixels can be formed at once, allowing great simplification of the manufacturing process and a great reduction in cost.

In the ink-jet system, pixels are colored by using a plurality of nozzles arranged in the array direction of a pixel array. In general, however, the amounts of inks discharged from the respective nozzles are not uniform. For this reason, a method of changing the ink landing density (ink discharge density) for each pixel in units of pixel arrays has been proposed.

In this method, ink discharge densities in a color filter coloring operation are determined by measuring the amount of ink discharged from each nozzle used to form each pixel, and then calculating the amount of ink landed onto each pixel.

It has recently been pointed out, however, that this determination process is complicated, requiring many steps from the step of measuring the amount of ink discharged from each nozzle to the step of setting discharge densities.

It is also pointed out that in this method, as the numbers of ink-jet heads and nozzles used in the manufacture of a color filter increase, the volume of correction data increases accordingly.

SUMMARY OF THE INVENTION

The present invention has been made in consideration of the above problems, and has as its object to provide an ink discharge density setting method which facilitates the process of setting discharge densities, and a color filter manufacturing method.

It is another object of the present invention to provide a color filter manufactured by the above manufacturing method, a display device, and an apparatus having the display device.

To solve the above problems and achieve the above objects, an ink discharge density setting method according to the present invention is characterized by the following steps.

There is provided an ink discharge density setting method in a method of manufacturing a color filter by relatively scanning a head unit having at least one ink-jet head and a color filter substrate and discharging inks from the ink-jet head onto the color filter substrate, comprising the line pattern formation step of forming a line pattern on a recording medium by discharging an ink from at least one ink discharging nozzle of the ink-jet head onto the recording medium at an ink discharge density M, the detection step of detecting a color density Dn of the line pattern, and the calculation step of, when a color density of a pixel which is required for the color filter is represented by D, calculating a discharge density Mn of an ink to be discharged onto the color filter substrate on the basis of the predetermined ink discharge density M, the color density Dn of the line pattern, and the required pixel color density D.

A color filter manufacturing method according to the present invention is characterized by the following steps.

There is provided an ink discharge density setting method in a method of manufacturing a color filter by relatively scanning a head unit having at least one ink-jet head and a color filter substrate and discharging inks from the ink-jet head onto the color filter substrate, comprising the line pattern formation step of forming a line pattern on a recording medium by discharging an ink from at least one ink discharging nozzle of the ink-jet head onto the recording medium at an ink discharge density M, the detection step of detecting a color density Dn of the line pattern, the calculation step of, when a color density of a pixel which is required for the color filter is represented by D, calculating a discharge density Mn of an ink to be discharged onto the color filter substrate on the basis of the predetermined ink discharge density M, the color density Dn of the line pattern, and the required pixel color density D, and the coloring step of coloring the color filter substrate by discharging an ink from the ink-jet head at the ink discharge density Mn calculated in the calculation step.

A color filter according to the present invention is characterized by the following arrangement.

There is provided a color filter manufactured by relatively scanning a head unit having at least one ink-jet head and a color filter substrate and discharging inks from the ink-jet head onto the color filter substrate, the color filter being manufactured through the line pattern formation step of forming a line pattern on a recording medium by discharging an ink from at least one ink discharging nozzle of the ink-jet head onto the recording medium at an ink discharge density M, the detection step of detecting a color density Dn of the line pattern, the calculation step of, when a color density of a pixel which is required for the color filter is represented by D, calculating a discharge density Mn of an ink to be discharged onto the color filter substrate on the basis of the predetermined ink discharge density M, the color density Dn of the line pattern, and the required pixel color density D, and the coloring step of coloring the color filter substrate by discharging an ink from the ink-jet head at the ink discharge density Mn calculated in the calculation step.

A display device according to the present invention is characterized by the following arrangement.

There is provided a display device integrally comprising a color filter manufactured by relatively scanning a head unit having at least one ink-jet head and a color filter substrate and discharging inks from the ink-jet head onto the color filter substrate, the color filter being manufactured through the line pattern formation step of forming a line pattern on a recording medium by discharging an ink from at least one ink discharging nozzle of the ink-jet head onto the recording medium at an ink discharge density M, the detection step of detecting a color density Dn of the line pattern, the calculation step of, when a color density of a pixel which is required for the color filter is represented by D, calculating a discharge density Mn of an ink to be discharged onto the color filter substrate on the basis of the predetermined ink discharge density M, the color density Dn of the line pattern, and the required pixel color density D, and the coloring step of coloring the color filter substrate by discharging an ink from the ink-jet head at the ink discharge density Mn calculated in the calculation step, and light amount changing means for changing a light amount.

An apparatus having a display device according to the present invention is characterized by the following arrangement.

There is provided an apparatus comprising a display device integrally including a color filter manufactured by relatively scanning a head unit having at least one ink-jet head and a color filter substrate and discharging inks from the ink-jet head onto the color filter substrate, the color filter being manufactured through the line pattern formation step of forming a line pattern on a recording medium by discharging an ink from at least one ink discharging nozzle of the ink-jet head onto the recording medium at an ink discharge density M, the detection step of detecting a color density Dn of the line pattern, the calculation step of, when a color density of a pixel which is required for the color filter is represented by D, calculating a discharge density Mn of an ink to be discharged onto the color filter substrate on the basis of the predetermined ink discharge density M, the color density Dn of the line pattern, and the required pixel color density D, and the coloring step of coloring the color filter substrate by discharging an ink from the ink-jet head at the ink discharge density Mn calculated in the calculation step, and light amount changing means for changing a light amount, and image signal supply means for supplying an image signal to the display device.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 14 is a view showing a concrete example of how dot densities are set in units of pixel arrays in the first embodiment;

FIG. 15 is a view showing a concrete example of correction image data for each nozzle used in the first embodiment;

FIG. 19 is a view showing a concrete example of how a new target value Mn' is set.

DETAILED DESCRIPTION OF THE PREFERRED EMBODIMENTS

The preferred embodiments of the present invention will be described in detail below with reference to the accompanying drawings.

(First Embodiment)

Figure 1:
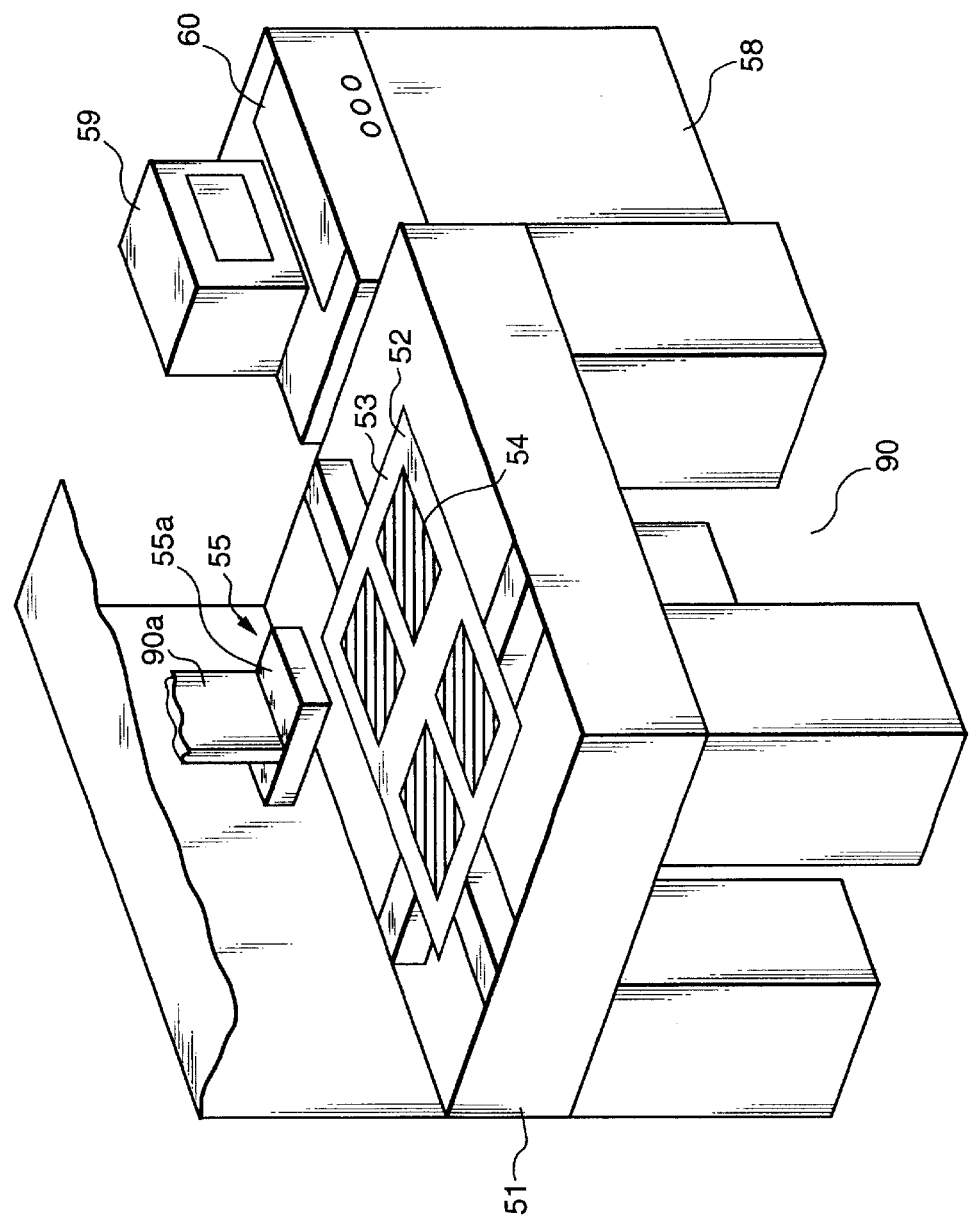
FIG. 1 is a schematic perspective view showing the arrangement of a color filter manufacturing apparatus according to the first embodiment of the present invention.

FIG. 1 is perspective view showing the arrangement of a color filter manufacturing apparatus according to the first embodiment of the present invention.

Referring to FIG. 1, reference numeral 51 denotes an apparatus base; 52, an X-Y-θ stage disposed on the apparatus base 51; 53, a color filter substrate set on the X-Y-θ stage 52; 54, color filters formed on the color filter substrate 53; 55, a head unit having a head mount 55a for supporting R (red), G (green), and B (blue) ink-jet heads for coloring the color filters 54; 58, a controller for controlling the overall operation of a color filter manufacturing apparatus 90; 59, a teaching pendant (personal computer) as the display unit of the controller; and 60, a keyboard as the operation unit of the teaching pendant 59. The head unit 55 is detachably mounted on a support portion 90a of the color filter manufacturing apparatus 90 such that the pivot angle of the unit can be adjusted within a horizontal plane.

Figure 2:
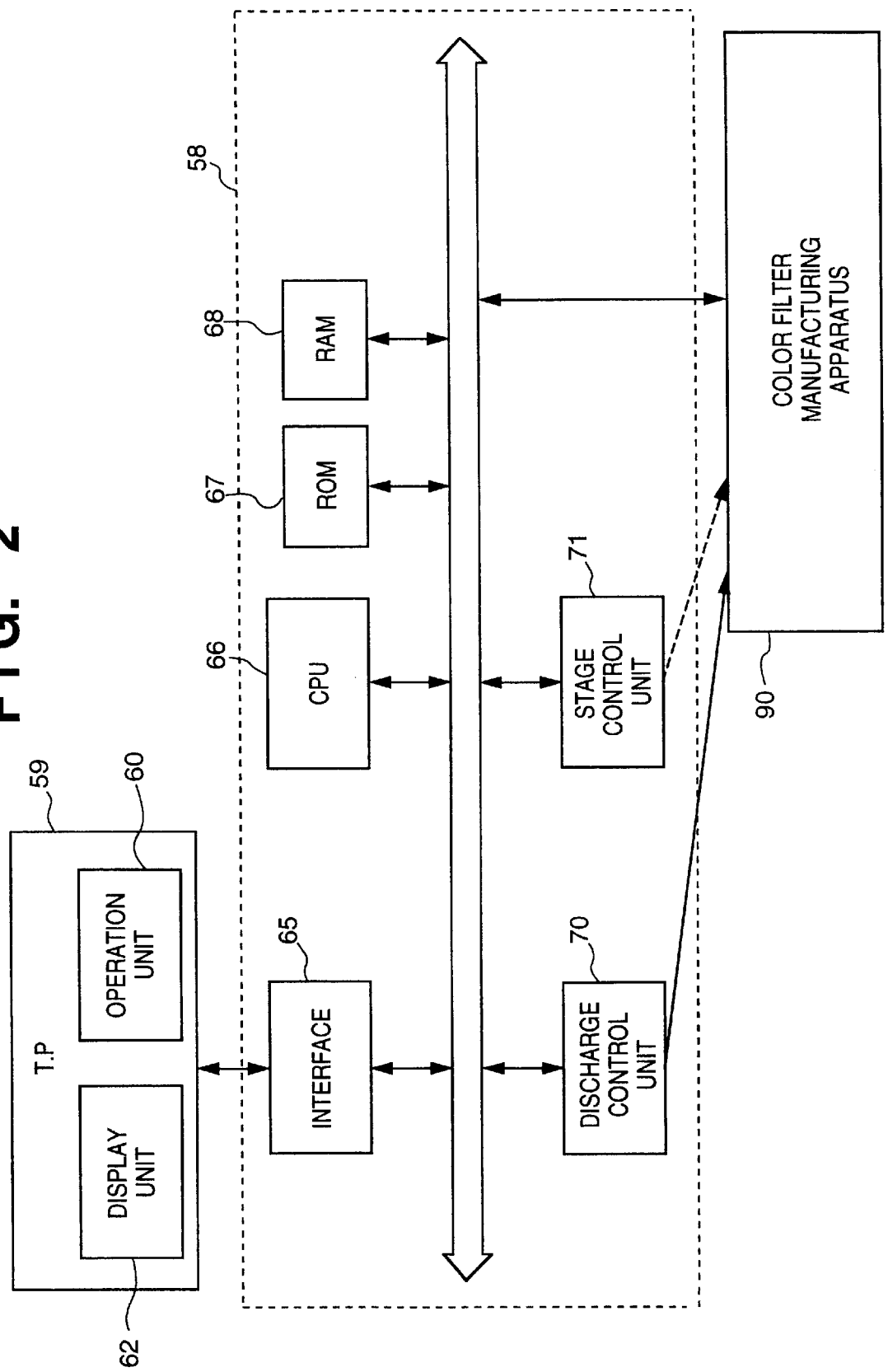
FIG. 2 is a block diagram showing the arrangement of a control unit for controlling the operation of the color filter manufacturing apparatus.

FIG. 2 is a block diagram showing the arrangement of the controller of the color filter manufacturing apparatus 90. The teaching pendant 59 serves as the input/output means of the controller 58. Reference numeral 62 denotes a display unit for displaying how a manufacturing process progresses, information indicating the presence/absence of a head abnormality, and the like. The operating unit (keyboard) 60 designates an operation of the color filter manufacturing apparatus 90 and the like.

The controller 58 controls the overall operation of the color filter manufacturing apparatus 90. Reference numeral 65 denotes an interface for exchanging data with the teaching pendant 59; 66, a CPU for controlling the color filter manufacturing apparatus 90; 67, a ROM storing control programs for operating the CPU 66; 68, a RAM for storing production information and the like; 70, a discharge control unit for controlling discharging of an ink into each pixel of a color filter; and 71, a stage control unit for controlling the operation of the X-Y-θ stage 52 of the color filter manufacturing apparatus 90. The color filter manufacturing apparatus 90 is connected to the controller 58 and operates in accordance with instructions therefrom.

Figure 3:
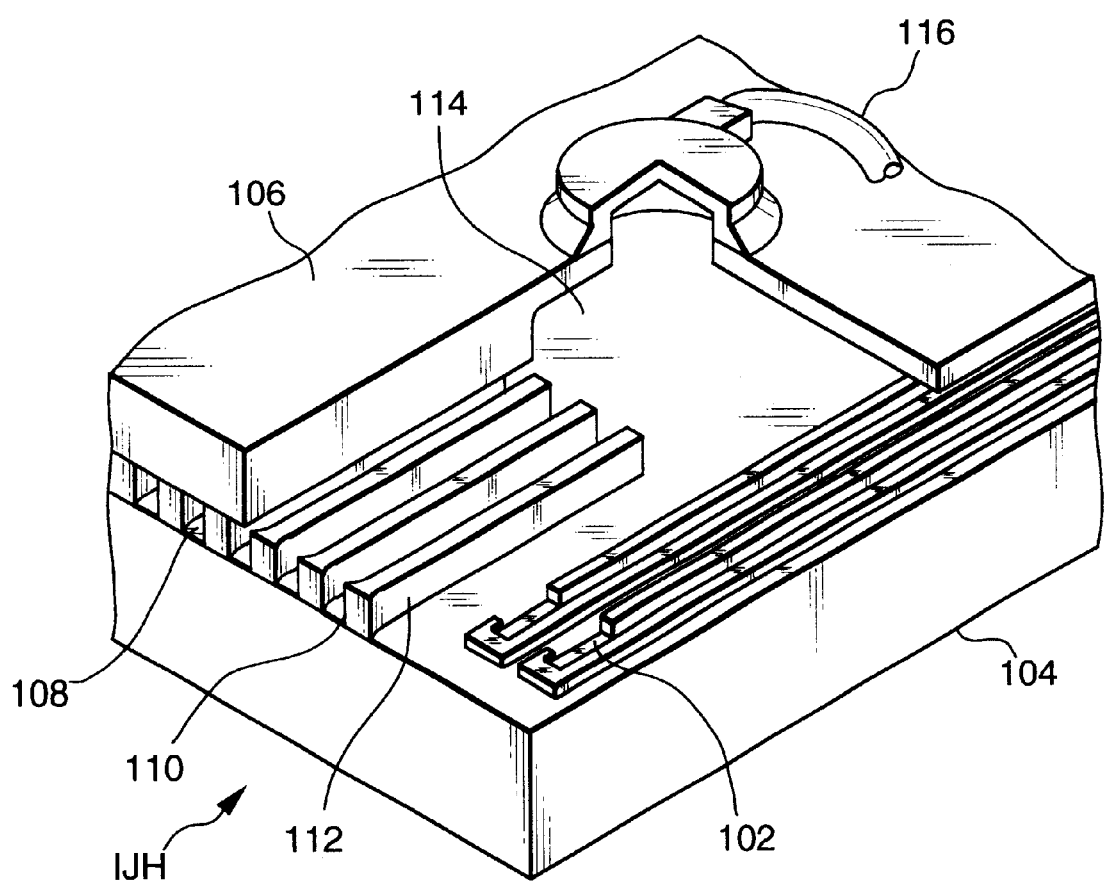
FIG. 3 is a perspective view showing the structure of an ink-jet head used in the color filter manufacturing apparatus.

FIG. 3 shows the structure of an ink-jet head IJH used in the color filter manufacturing apparatus 90. Referring to FIG. 1, in the head unit 55, three ink-jet heads are arranged in correspondence with three colors, i.e., R, G, and B. Since these three heads have the same structure, FIG. 3 shows the structure of one of the three heads as a representative.

Referring to FIG. 3, the ink-jet head IJH mainly comprises a heater board 104 as a board on which a plurality of heaters 102 for heating an ink are formed, and a ceiling plate 106 mounted on the heater board 104. A plurality of discharging openings 108 are formed in the ceiling plate 106. Tunnel-like fluid passages 110 communicating with the discharging openings 108 are formed therebehind. The respective fluid passages 110 are isolated from the adjacent fluid passages via partition walls 112. The respective fluid passages 110 are commonly connected to one ink chamber 114 at the rear side of the fluid passages. An ink is supplied to the ink chamber 114 via an ink inlet 116. This ink is supplied from the ink chamber 114 to each fluid passage 110.

The heater board 104 and the ceiling plate 106 are positioned such that the position of each heater 102 coincides with that of a corresponding fluid passage 110, and are assembled into the state shown in FIG. 3. Although FIG. 3 shows only two heaters 102, the heater 102 is arranged in correspondence with each fluid passage 110. When a predetermined driving signal is supplied to the heater 102 in the assembled state shown in FIG. 3, an ink above the heater 102 is boiled to produce a bubble, and the ink is pushed and discharged from the discharging opening 108 upon volume expansion of the ink. Therefore, the size of a bubble can be adjusted by controlling a driving pulse applied to the heater 102, e.g., controlling the magnitude of power. That is, the volume of the ink discharged from each discharging opening can be arbitrarily controlled.

FIGS. 4A to 4F show the process of manufacturing a color filter.

In general, a glass substrate is used as a substrate 1 in this embodiment. However, a substrate other than a glass substrate can be used as long as it has characteristics required for a liquid crystal color filter, e.g., good transparency and high mechanical strength.

Figure 4A:
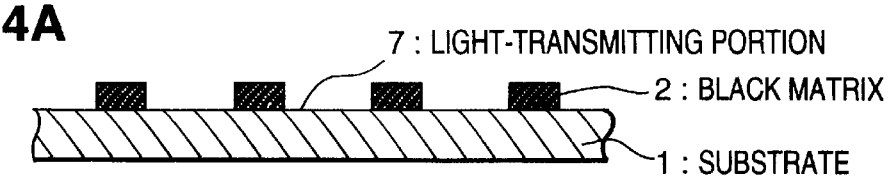
FIGS. 4A to 4F are sectional views showing a color filter manufacturing process.
Figure 4B:
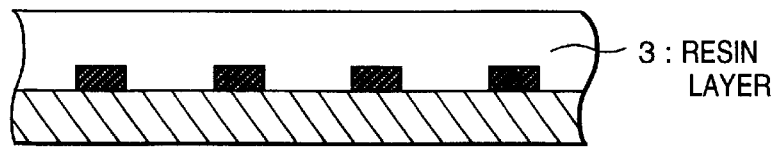

FIG. 4A shows the glass substrate 1 having light-transmitting portions 7 and a black matrix 2 serving as light-shielding portions. First of all, the glass substrate 1, on which the black matrix 2 is formed, is coated with a resin composition which can be cured upon irradiation of light or irradiation of light and heating, and has ink receptivity. The resultant structure is pre-baked, as needed, to form a resin layer 3 (FIG. 4B). The resin layer 3 can be formed by a coating method such as spin coating, roller coating, bar coating, spraying, or dipping. However, the present invention is not limited to any specific coating method.

Figure 4C:
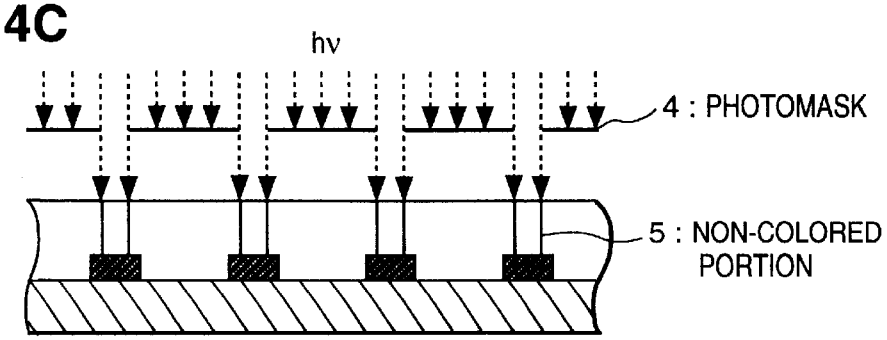
Figure 4D:
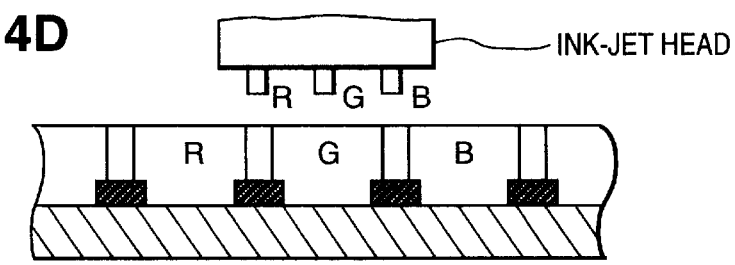

Subsequently, pattern exposure is performed in advance onto resin layer portions light-shielded by the black matrix 2 by using a photomask 4 to cure the exposed portions of the resin layer so as to form portions 5 (non-colored portions) which do not absorb an ink (FIG. 4C). Thereafter, the resin layer is colored in R, G, and B at once by using the ink-jet heads (FIG. 4D), and the inks are dried, as needed.

As the photomask 4 used when pattern exposure is performed, a mask having opening portions for curing the portions light-shielded by the black matrix is used. In this case, in order to prevent a color omission of the color material at a portion in contact with the black matrix, a relatively large amount of ink must be discharged. For this reason, a mask having opening portions each having a size smaller than the width of each light-shielding portion of the black matrix is preferably used.

As an ink to be used for a coloring operation, both dye and pigment inks can be used, and both liquid and solid inks can be used.

As a curable resin composition to be used in the present invention, any resin composition which has ink receptivity and can be cured by at least one of the following treatments: irradiation of light and a combination of irradiation of light and heating, can be used. As resins, acrylic resin, epoxy resin, and silicone resin are available. As cellulose derivatives, hydroxypropyl cellulose, hydroxy ethyl cellulose, methyl cellulose, carboxymethyl cellulose are available, and modified materials thereof are also available.

Optical initiators (crosslinkers) can also be used to crosslink these resins by irradiation of light or irradiation of light and heating. As optical initiators, dichromate, a bis-azide compound, a radical-based initiator, a cation-based initiator, an anion-based initiator, and the like can be used. Mixtures of these optical initiators and combinations of the initiators and sensitizers can also be used. In addition, an optical acid generating agent such as onium salt can be used as a crosslinker. In order to make a crosslinking reaction further progress, a heat treatment may be performed after irradiation of light.

Resin layers containing these compositions have excellent heat resistance, excellent water resistance, and the like, and are sufficiently resistant to high temperatures and cleaning in the subsequent steps.

As an ink-jet system used in the present invention, a bubble-jet type using an electrothermal converter as an energy generating element, a piezoelectric jet type using a piezoelectric element, or the like can be used. A coloring area and coloring pattern can be arbitrarily set.

This embodiment exemplifies the structure in which the black matrix is formed on the substrate. However, after a curable resin composition layer is formed or after coloring is performed, a black matrix may be formed on the resin layer without posing any problem. That is, the form of a black matrix is not limited to that in this embodiment. As a method of forming a black matrix, a method of forming a thin metal film on a substrate by sputtering or deposition, and patterning the film by a photolithographic process is preferably used. However, the present invention is not limited to this.

Figure 4E:
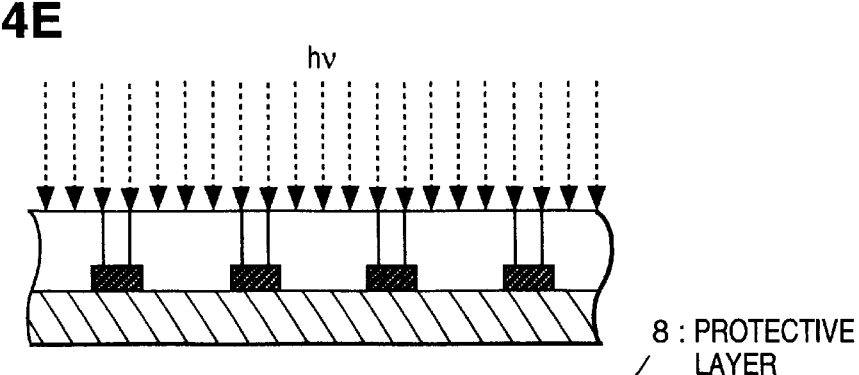
Figure 4F:
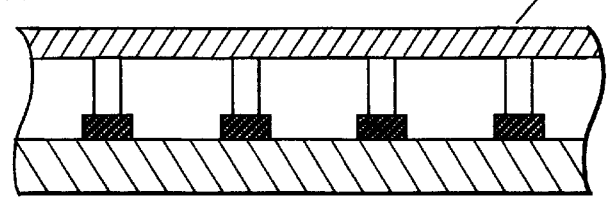

Subsequently, the curable resin composition is cured by performing only one of the following treatments: irradiation of light, a heat treatment, and a combination of irradiation of light and a heat treatment (FIG. 4E). A protective layer 8 is formed, as needed (FIG. 4F). Note that reference symbol hv denotes the intensity of light. When a heat treatment is to be performed, heat is applied instead of hv. The protective layer 8 can be made of a second resin composition of a photo-setting type, thermosetting type, or photo-setting/thermosetting type. The resultant layer needs to have transparency upon formation of a color filter and be sufficiently resistant to the subsequent processes such as an ITO formation process and an aligning film formation process.

Figure 5:
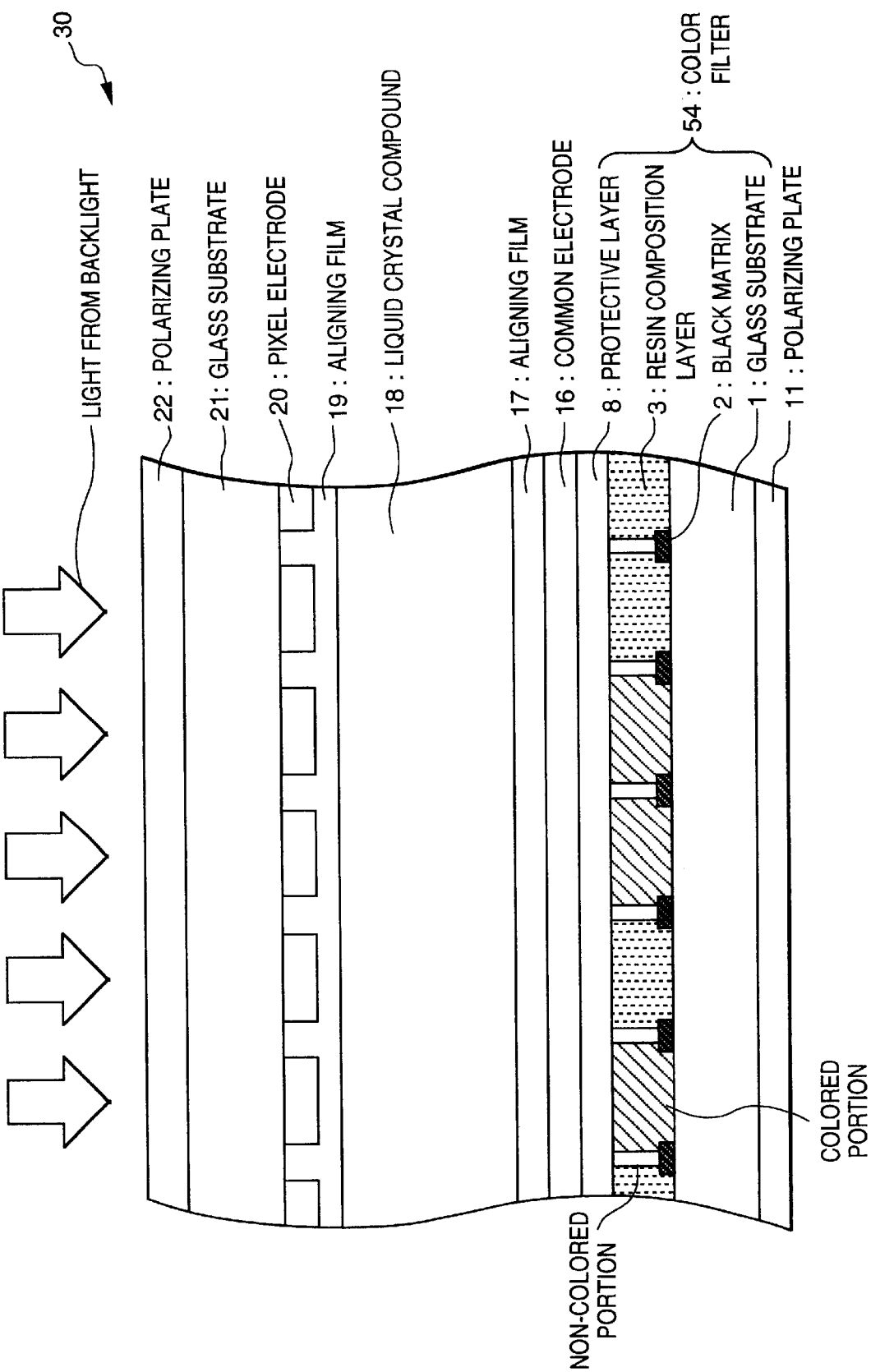
FIG. 5 is a sectional view showing the basic structure of a color liquid crystal display device incorporating a color filter.

FIG. 5 is a sectional view showing the basic structure of a color liquid crystal display device 30 incorporating the above color filter.

In general, a color liquid crystal display device is formed by joining the color filter substrate 1 to a counter substrate 21 and sealing a liquid crystal compound 18 therebetween. TFTs (Thin Film Transistors) (not shown) and transparent pixel electrodes 20 are formed on the inner surface of one substrate 21 of the liquid crystal display device in a matrix form. The color filter 54 is placed on the inner surface of the other substrate 1 such that the R, G, and B coloring materials are positioned to oppose the pixel electrodes. A transparent counter electrode (common electrode) 16 is formed on the entire surface of the color filter 54. The black matrix 2 is generally formed on the color filter substrate 1 side. Aligning films 19 are formed within the planes of the two substrates. By performing a rubbing process for the aligning films, the liquid crystal molecules can be aligned in a predetermined direction. Polarizing plates 11 and 22 are bonded to the outer surface of the respective glass substrates. The liquid crystal compound 18 is filled in the gap (about 2 to 5 $\mu$m) between these glass substrates. As a blacklight, a combination of a fluorescent lamp (not shown) and a scattering plate (not shown) is generally used. A display operation is performed by causing the liquid crystal compound to serve as an optical shutter for changing the transmittance for light emitted from the backlight.

A case wherein the above liquid crystal display device is applied to an information processing apparatus will be described below with reference to FIGS. 6 to 8.

Figure 6:
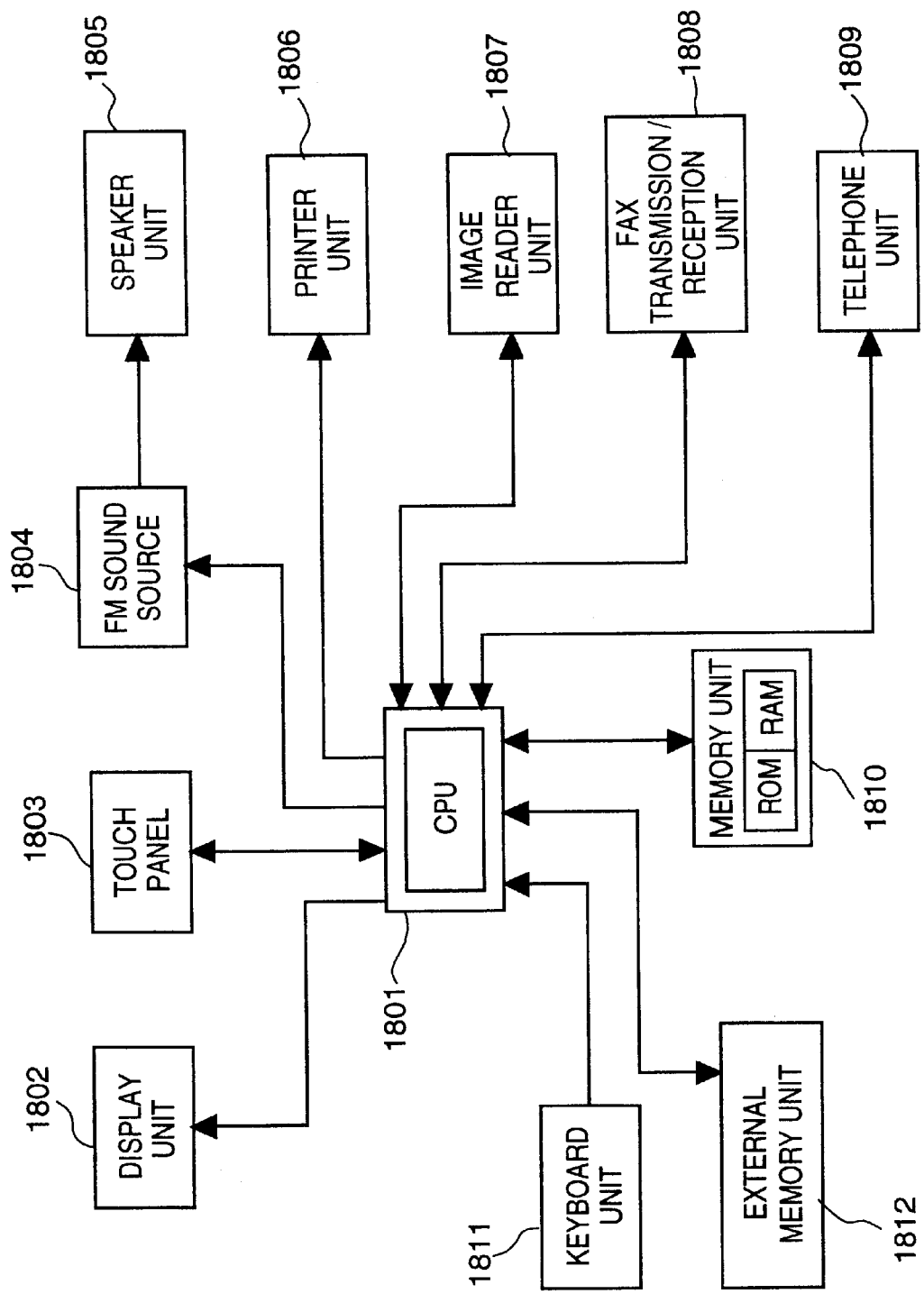
FIG. 6 is a block diagram showing an information processing apparatus in which the liquid crystal display device is used.

FIG. 6 is a block diagram showing the schematic arrangement of an information processing apparatus serving as a wordprocessor, a personal computer, a facsimile apparatus, and a copying machine, to which the above liquid crystal display device is applied.

Referring to FIG. 6, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader 1807, and the like on the display screen; 1803, a transparent, pressure-sensitive touch panel mounted on the display unit 1802. By pressing the surface of the touch panel 1803 with a finger of the user or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. An electrical signal from the FM sound source unit 1804 is converted into an audible sound by a speaker unit 1805. A printer unit 1806 is used as an output terminal for the wordprocessor, the personal computer, the facsimile apparatus, and the copying machine.

Reference numeral 1807 denotes an image reader unit for photoelectrically reading original data. The image reader unit 1807 is arranged midway along the original convey passage and designed to read originals for facsimile and copy operations and other various originals.

Reference numeral 1808 denotes a transmission/reception unit for the facsimile (FAX) apparatus. The transmission/reception unit 1808 transmits original data read by the image reader unit 1807 by facsimile, and receives and decodes a sent facsimile signal. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs of the user, and the like.

Figure 7:
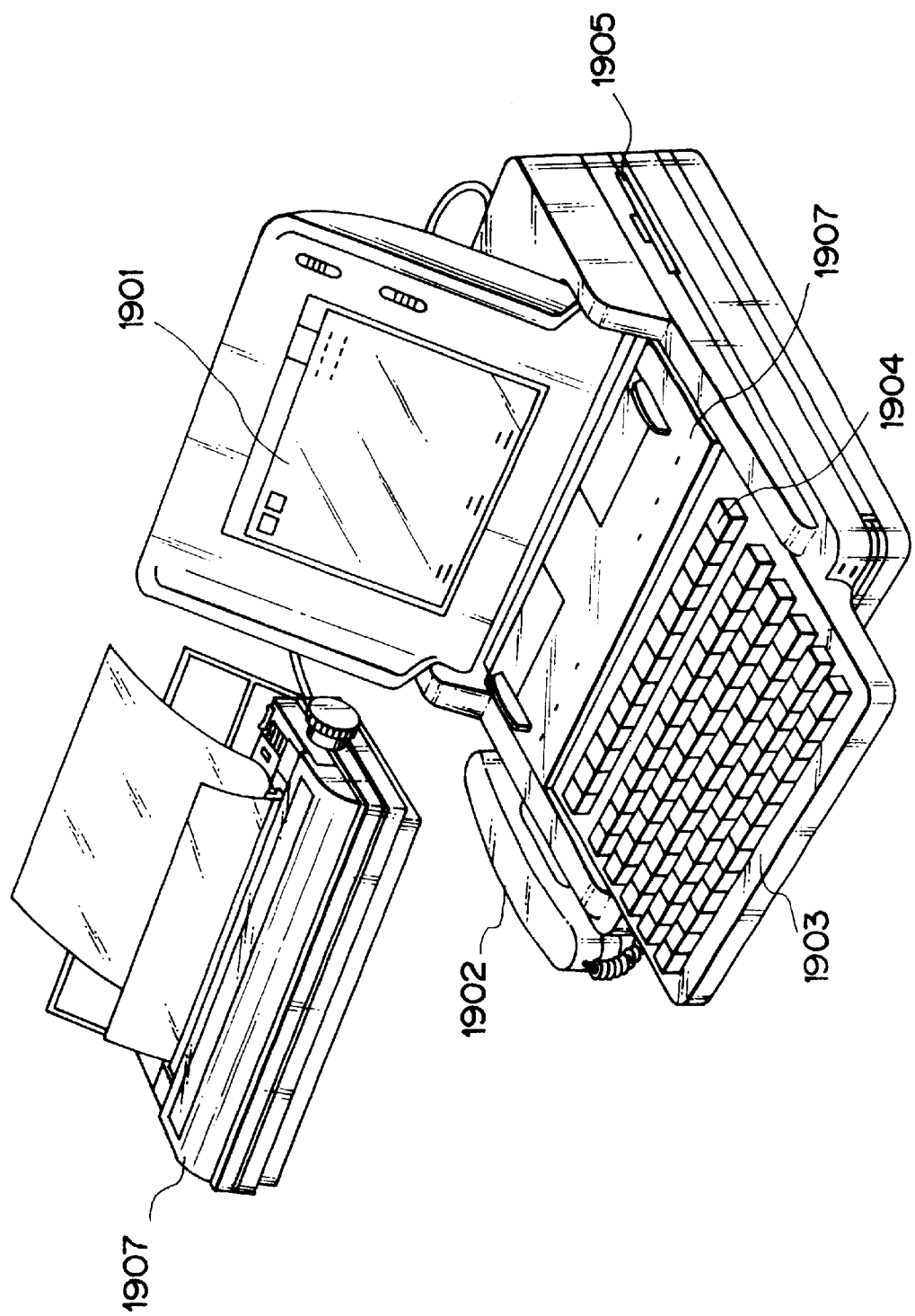
FIG. 7 is a perspective view showing the information processing apparatus in which the liquid crystal display device is used.

FIG. 7 is a perspective view of the information processing apparatus in FIG. 6.

Referring to FIG. 7, reference numeral 1901 denotes a flat panel display using the above liquid crystal display device, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original table on which an original to be read by the image reader unit 1807 is placed. The read original is discharged from the rear portion of the apparatus. In a facsimile receiving operation, received data is printed out by an ink-jet printer 1907.

When the above information processing apparatus is to serve as a personal computer or a wordprocessor, various kinds of information input through the keyboard unit 1811 are processed by the control unit 1801 in accordance with a predetermined program, and the resultant information is output, as an image, to the printer unit 1806.

When the information processing apparatus is to serve as the receiver of the facsimile apparatus, facsimile information input through the transmission/reception unit 1808 via a communication line is subjected to reception processing in the control unit 1801 in accordance with a predetermined program, and the resultant information is output, as a received image, to the printer unit 1806.

When the information processing apparatus is to serve as the copying machine, an original is read by the image reader unit 1807, and the read original data is output, as an image to be copied, to the printer unit 1806 via the control unit 1801. Note that when the information processing apparatus is to serve as the receiver of the facsimile apparatus, original data read by the image reader unit 1807 is subjected to transmission processing in the control unit 1801 in accordance with a predetermined program, and the resultant data is transmitted to a communication line via the transmission/reception unit 1808.

Figure 8:
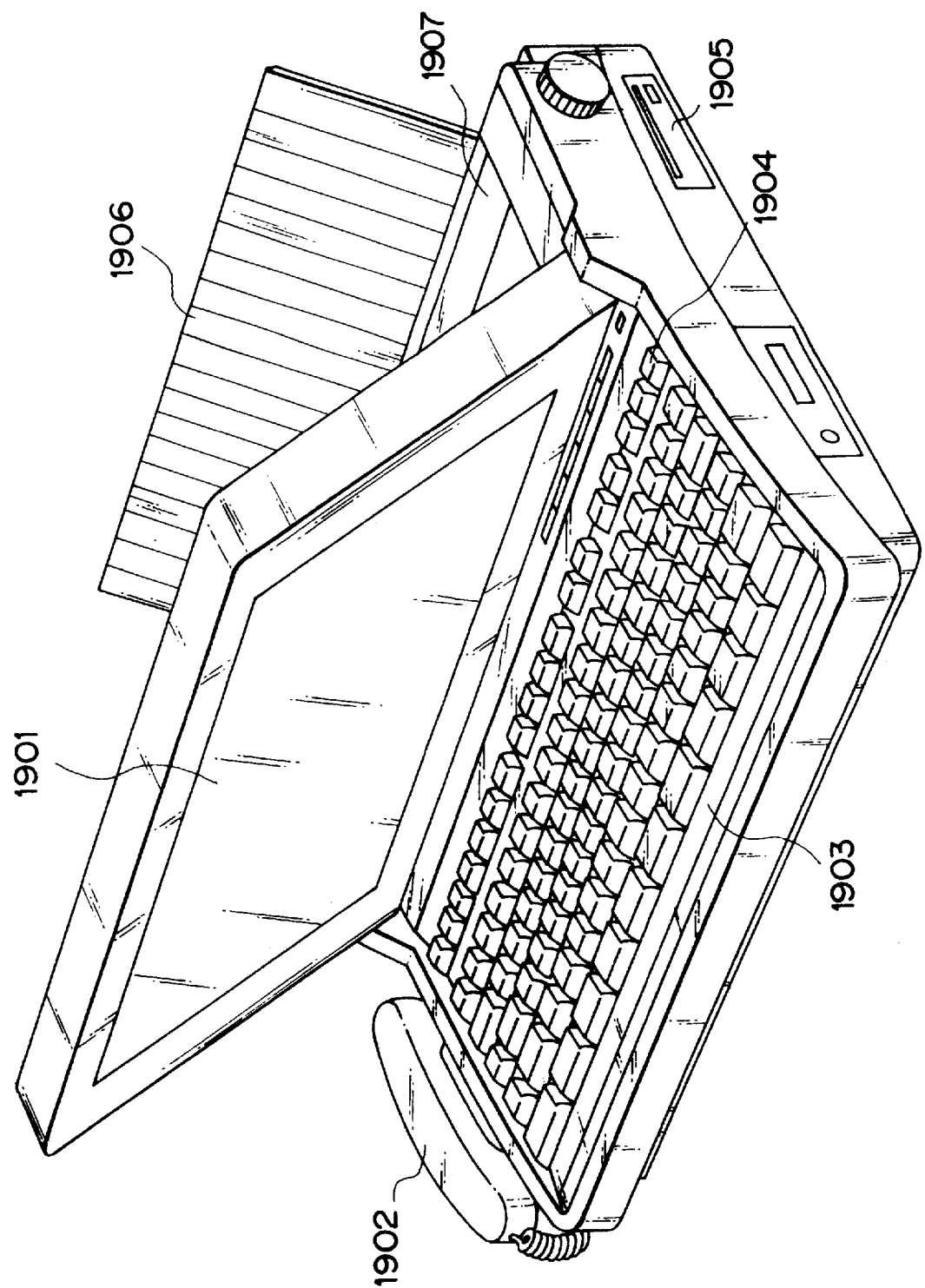
FIG. 8 is a perspective view showing the information processing apparatus in which the liquid crystal display device is used.

Note that the above information processing apparatus may be designed as an integrated apparatus incorporating an ink-jet printer in the main body, as shown in FIG. 8. In this case, the portability of the apparatus can be improved. The same reference numerals in FIG. 8 denote parts having the same functions as those in FIG. 7.

A method of setting an ink landing density (ink discharge density) for each pixel in manufacturing a color filter, which is a characteristic feature of the present invention, will be described next.

Figure 9:
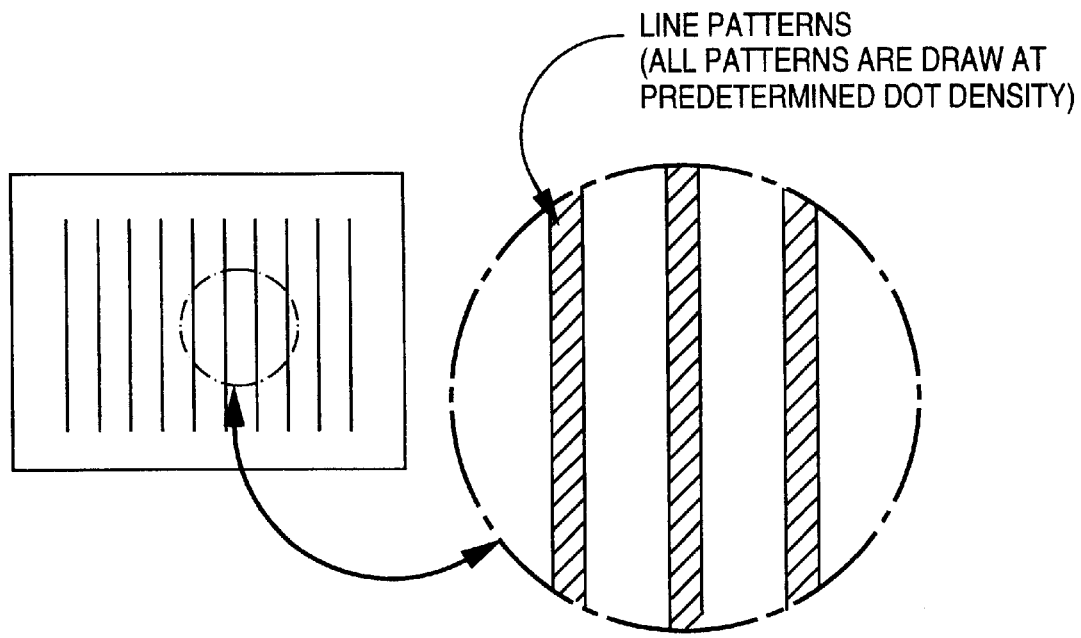
FIG. 9 is a view showing line patterns drawn on a substrate with a plurality of different nozzles.
Figure 10:
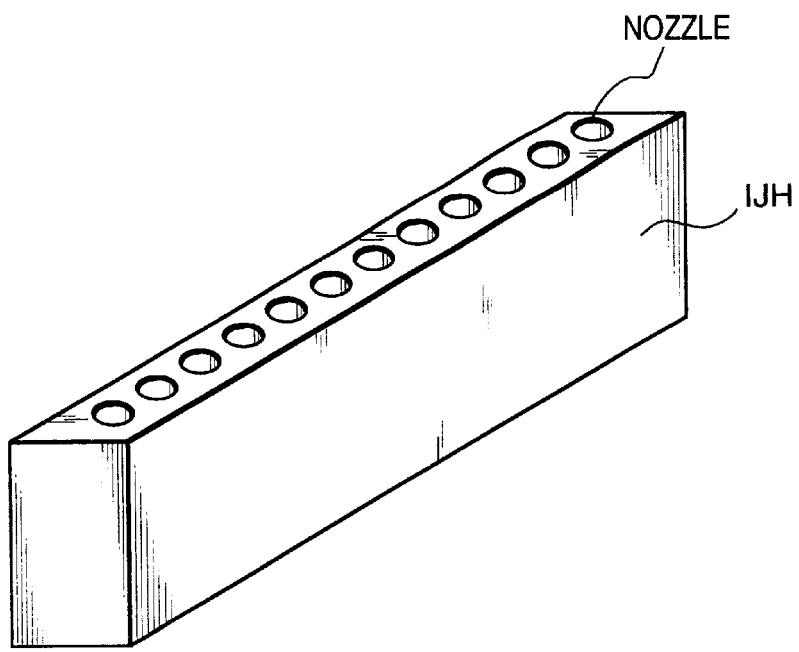
FIG. 10 is a perspective view showing an ink-jet head which can draw one pixel with one nozzle in one scanning operation.

FIG. 9 shows a plurality of line patterns formed on a glass substrate by an apparatus having an X-Y stage on which the ink-jet head unit 55 incorporating the ink-jet head IJH having a plurality of ink discharging nozzles as shown in FIG. 10 is mounted. More specifically, the line patterns are formed at a predetermined dot density M (dot/$\mu$m) by performing scanning a plurality of number of times, using different nozzles of the same head for the respective scanning operations. Note that the above dot density M indicates the density of ink discharged in one scanning operation.

Even when the nozzles to be used for the respective scanning operations are changed, an ink is discharged at the same ink discharge density M in the respective scanning operations. A combination of nozzles of the ink-jet head IJH (the ink discharging nozzles used in a plurality of scanning operations are changed for the respective scanning operations) which is used to color a specific one of the line patterns formed in the above manner is known in advance. These combinations of nozzles are set in advance to correspond to combinations of nozzles to be used to color the pixels of a color filter. Each pixel is formed by using a plurality of nozzles to reduce color irregularity by dispersing the influences of the characteristics of the respective nozzles such as changes in discharging amount with time.

Figure 11:
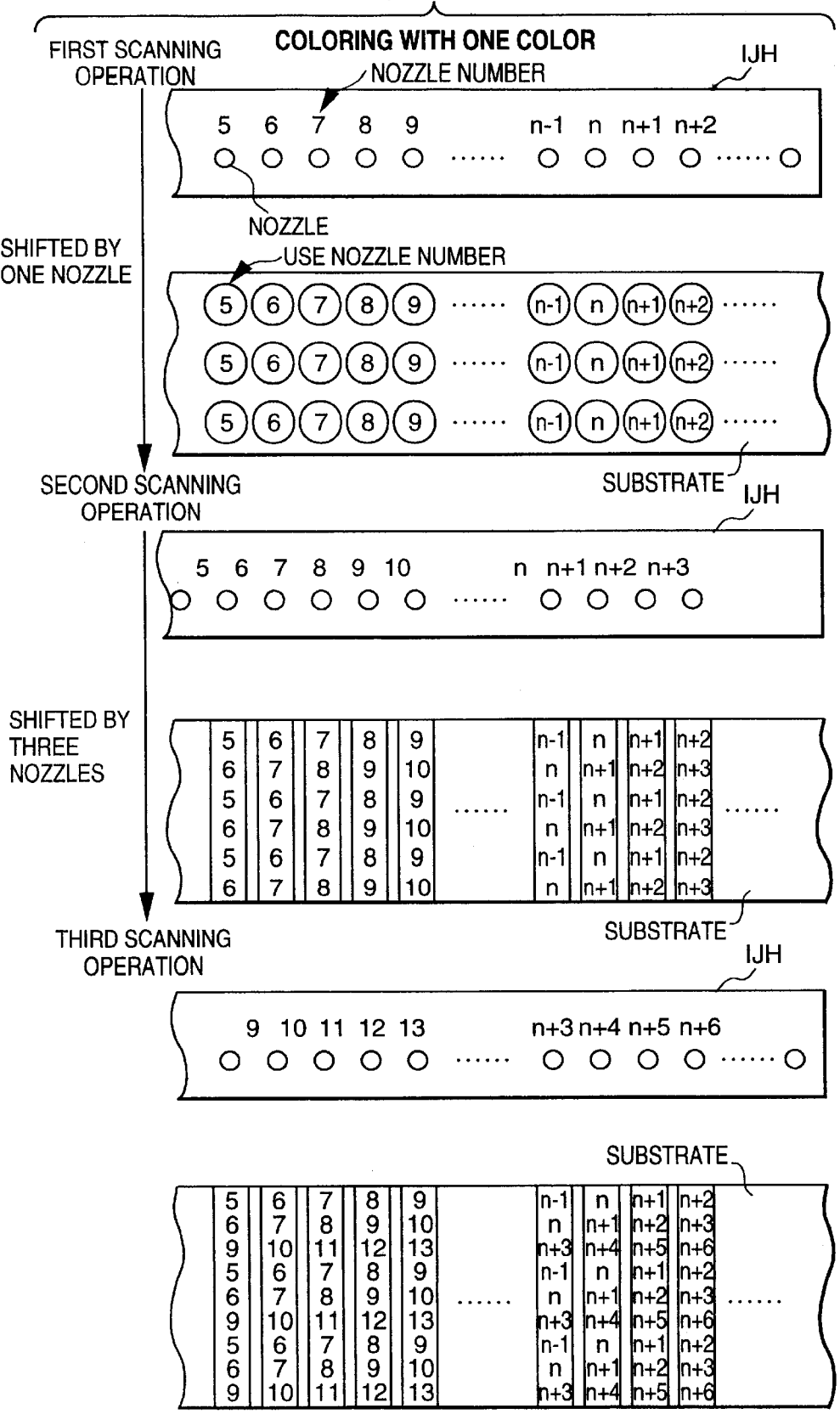
FIG. 11 is a view showing combinations of nozzles.
Figure 12:
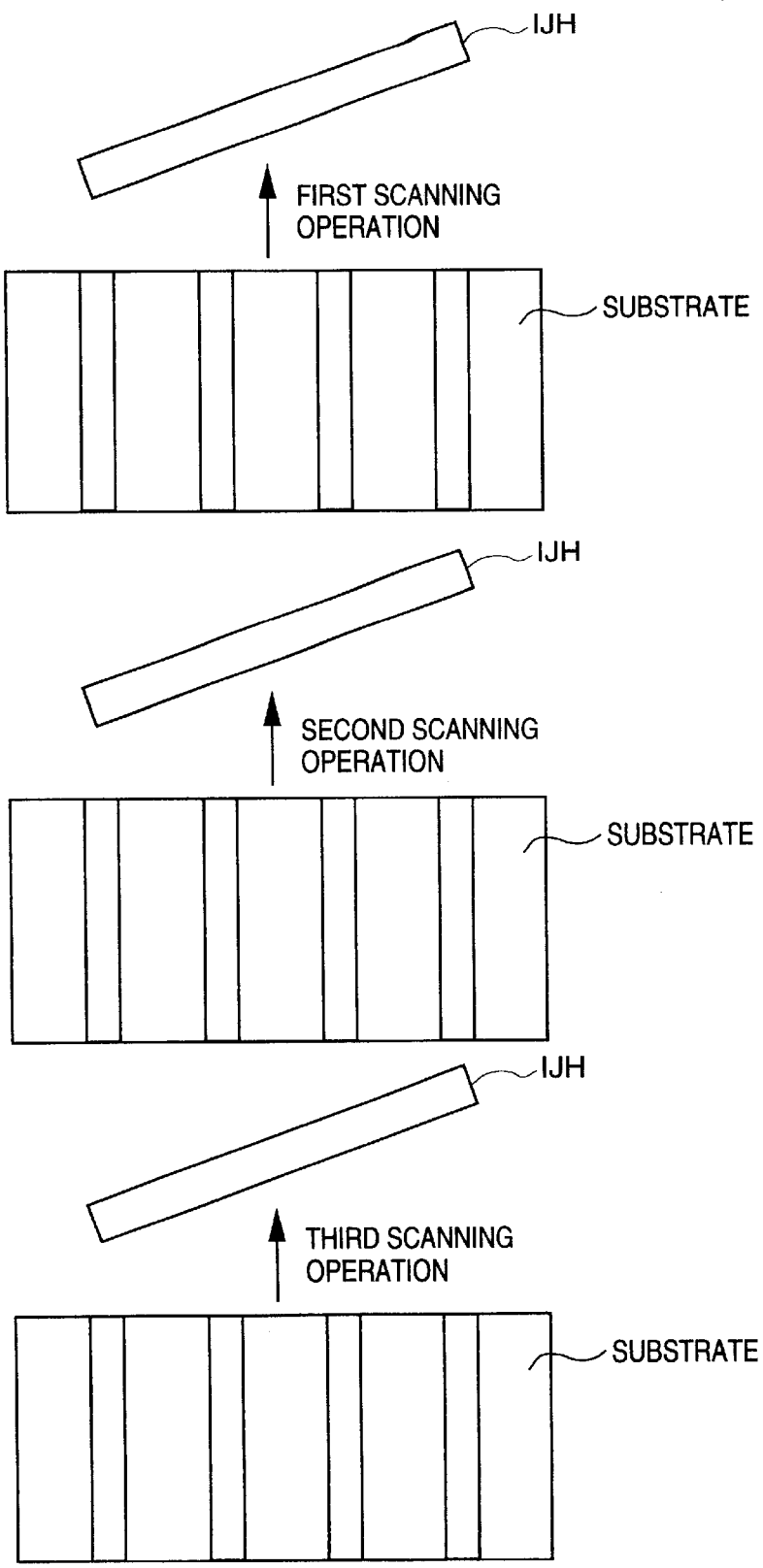
FIG. 12 is a view showing the number of times of scanning in the first embodiment.

In this embodiment, one pixel array of a color filter is colored with inks discharged from three different nozzle. However, the present invention is not limited to this. A case in which one pixel array is colored with inks discharged from two nozzles or four or more nozzles is essentially the same as this embodiment. In the embodiment, each pixel is colored such that the number of times the ink-jet head relatively scans a substrate is minimized. As shown in FIG. 11, a plurality of nozzle numbers indicating nozzles used for coloring the respective pixel arrays are constantly shifted with respect to the respective pixel arrays. The numbers on the substrate indicate the nozzle numbers used to form the corresponding ink dots. In this embodiment, therefore, the ink-jet head IJH is scanned three times to color line patterns and color filter pixels, as shown in FIG. 12.

Figure 13:
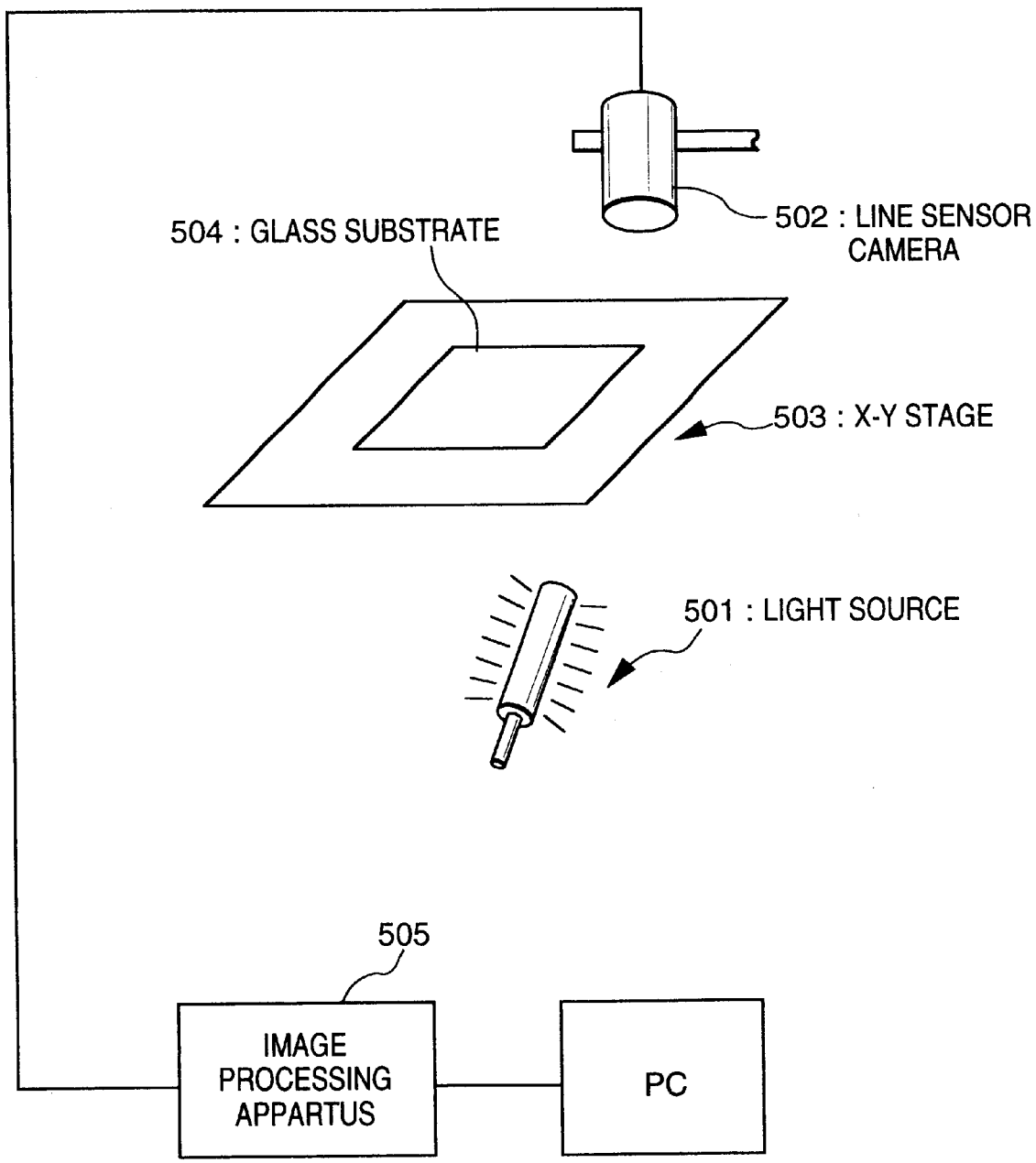
FIG. 13 is a view showing the arrangement of an absorbance measuring system.

The above line patterns are sensed by a line sensor camera 502 with a transmission light source 501 being set to a proper intensity, as shown in FIG. 13. The resultant image is input to an image processing apparatus 505. The image becomes patterns each having a luminance level corresponding to the intensity of the input light. The image processing apparatus 505 then calculates an absorbance $D_n$ of each line pattern. $D_n$ represents the absorbance of a line pattern colored by a combination of nozzles to be used to land inks onto the nth pixel array of a color filter substrate to be actually colored. The absorbance is theoretically proportional to the dye concentration.

Subsequently, ink discharge densities (dot densities) are determined to make the amounts of inks landed onto the respective pixel arrays uniform. To color all pixel arrays at a predetermined ink amount, the density of ink dots landed from the ink-jet head IJH is changed for each pixel array. In this embodiment, the absorbance of each pixel array is set to a predetermined value D. The value D is set such that the color density of a color filter to be manufactured satisfies specifications such as chromaticity.

The relationship between a density $M_n$ and an absorbance $y$ of ink dots from each nozzle which are to be landed onto the nth pixel array is given by $$(D_n/M) \times M_n = y$$

If $y=D$, then $M_n$ is determined.

In practice, however, a measuring device and a measuring method used to measure line patterns have their own characteristics. It was therefore found that in the system used by the present inventors and the like, the following approximate expression was accurate in a practical range:

$$K_n \times M_n + b_n = y$$

In this expression, $K_n$ is theoretically $D_n/M$, and $b_n$ is 0. Experimentally, however, various errors such as measurement errors occur, and hence values $K_n$ and $b_n$ obtained by experiment are used. In this embodiment, therefore, the values Kn and bn and Mn are determined first. More specifically, a plurality of types of line patterns are drawn by using a plurality of nozzles with different discharge densities, and the absorbances and ink discharge densities of the line patterns are measured. The relationship between the measured absorbances and ink discharge densities are then plotted on a graph. The resultant points on the graph are subjected to least square fitting based on the above expression to obtain a straight line representing the relationship between the absorbances and the ink discharge densities. Two variables, i.e., Kn and bn, are then determined. In this case, Kn represents the slope of the above straight line; and bn, the y segment. Mn is determined to set y=D. FIG. 14 shows examples of the data obtained by the method of this embodiment.

Ink discharge densities for a color filter coloring operation are set from this value Mn. Image data for setting three different ink discharge densities must be generated to perform scanning three times while changing the nozzles to be used. A pixel array number n representing a pixel array to be colored by each nozzle in three scanning operations is determined in advance, and the ink discharge density Mn for each nozzle in coloring the pixel array is determined in advance. Therefore, the ink discharge pitch of each nozzle in coloring a color filter in practice can be easily set as the reciprocal of Mn. The color filter is actually colored at this ink discharge pitch. FIG. 15 shows an example of each data in coloring the color filter.

When the amount of ink discharged from each nozzle changes while a color filter is manufactured, the values Kn and bn for each line pattern change.

In this case, a plurality of line patterns are drawn again at different ink discharge densities, and the absorbances and ink discharge densities of the respective line patterns are measured, thereby obtaining values Kn' and bn' from the expression representing the relationship between the absorbances and the ink discharge densities.

In this case, however, it takes much time. For this reason, if the change amount is small (about 10% or less), the value bn is regarded as approximately constant, and it is assumed that the value Kn has changed with a change in discharging amount. When discharge densities are obtained in this manner, the resultant values are almost equal to those obtained above. The precision of the values Kn' and bn' is irrelevant to the gist of the present invention.

A concrete example of this embodiment will be described in detail by taking the latter case as an example.

In this case, as is obvious, a new value Kn' can be obtained from the absorbance y obtained by measuring each pixel again, and a new value Mn' can be determined for each pixel in accordance with a target absorbance.

A concrete example of this embodiment will be described with reference to FIG. 19. As indicated by the drawing conditions, the respective pixels are drawn by setting the dot densities Mn to 1/99.9771, 1/105.1484, and 1/96.59553 in accordance with a target absorbance of 0.25, thereby producing a good color filter without irregularity.

Assume that the amount of ink discharged from a given nozzle changes with time after a lapse of a given period of time, and the color filter undergoes irregularity. In this case, it is detected by measurement that the density of pixel array 2 has increased to 0.26.

Kn' is calculated again by substituting the above value into the following equation as follows:

$$Kn' \times Mn + bn = y$$

then, $$Kn' = (0.26 - 0.013379) \times 105.1484 = 25.9318$$

A new dot density Mn' corresponding to a target absorbance of 0.25 is obtained by using these values Kn' and bn as follows:

$$Mn' = (y - bn)/Kn' = (0.25 - 0.013379)/25.9318 = 1/109.5921$$

That is, the absorbances of the respective pixels are made uniform again to be set to 0.25 by changing the discharge pitch of each nozzle from 105.1484 μm to 109.5921 μm in forming a pixel array represented by the pixel array number "2". With this operation, a color filter without irregularity can be produced.

(Second Embodiment)

Figure 16:
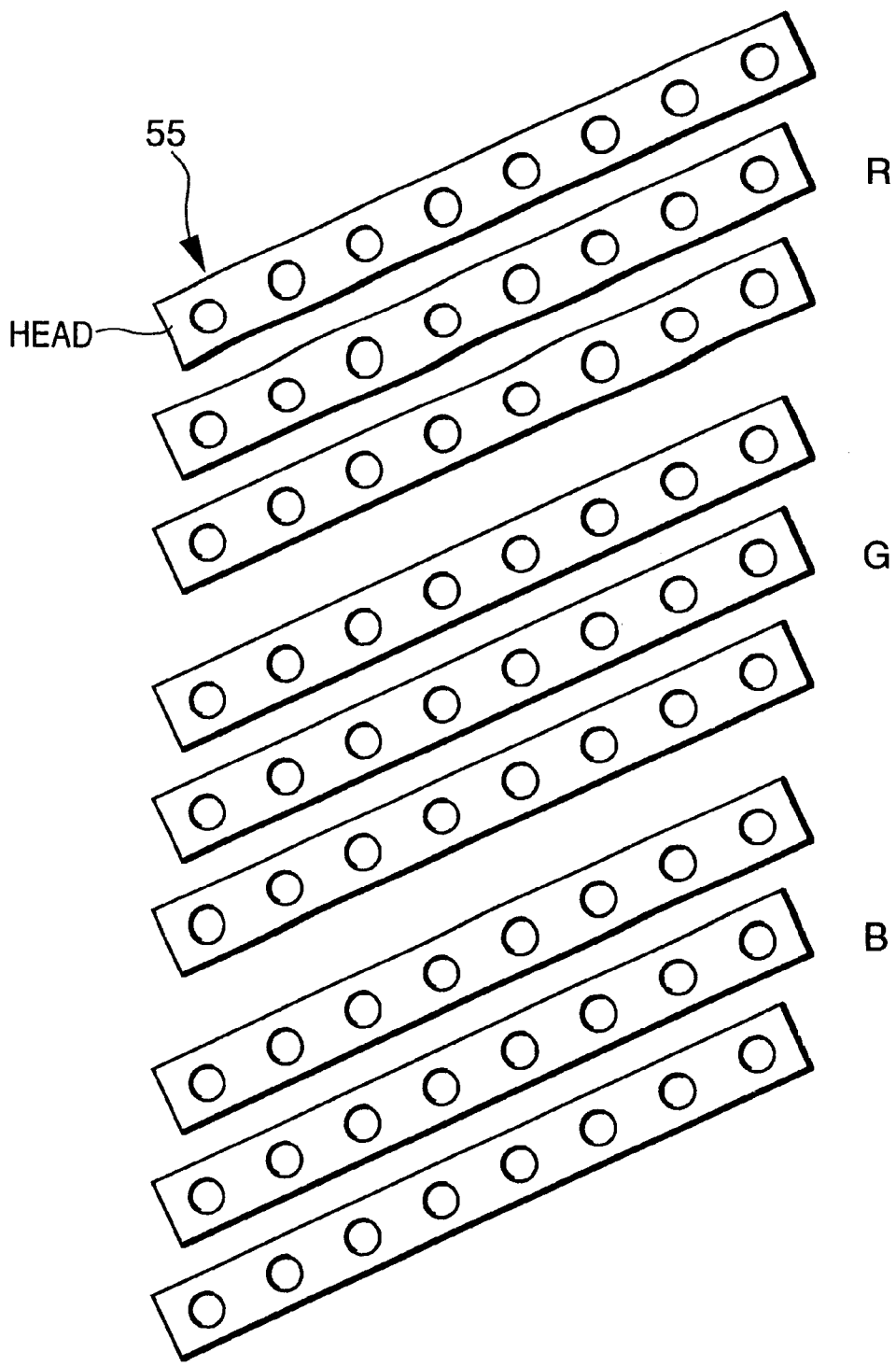
FIG. 16 is a view showing the arrangement of ink-jet heads used in the second embodiment of the present invention.
Figure 17:
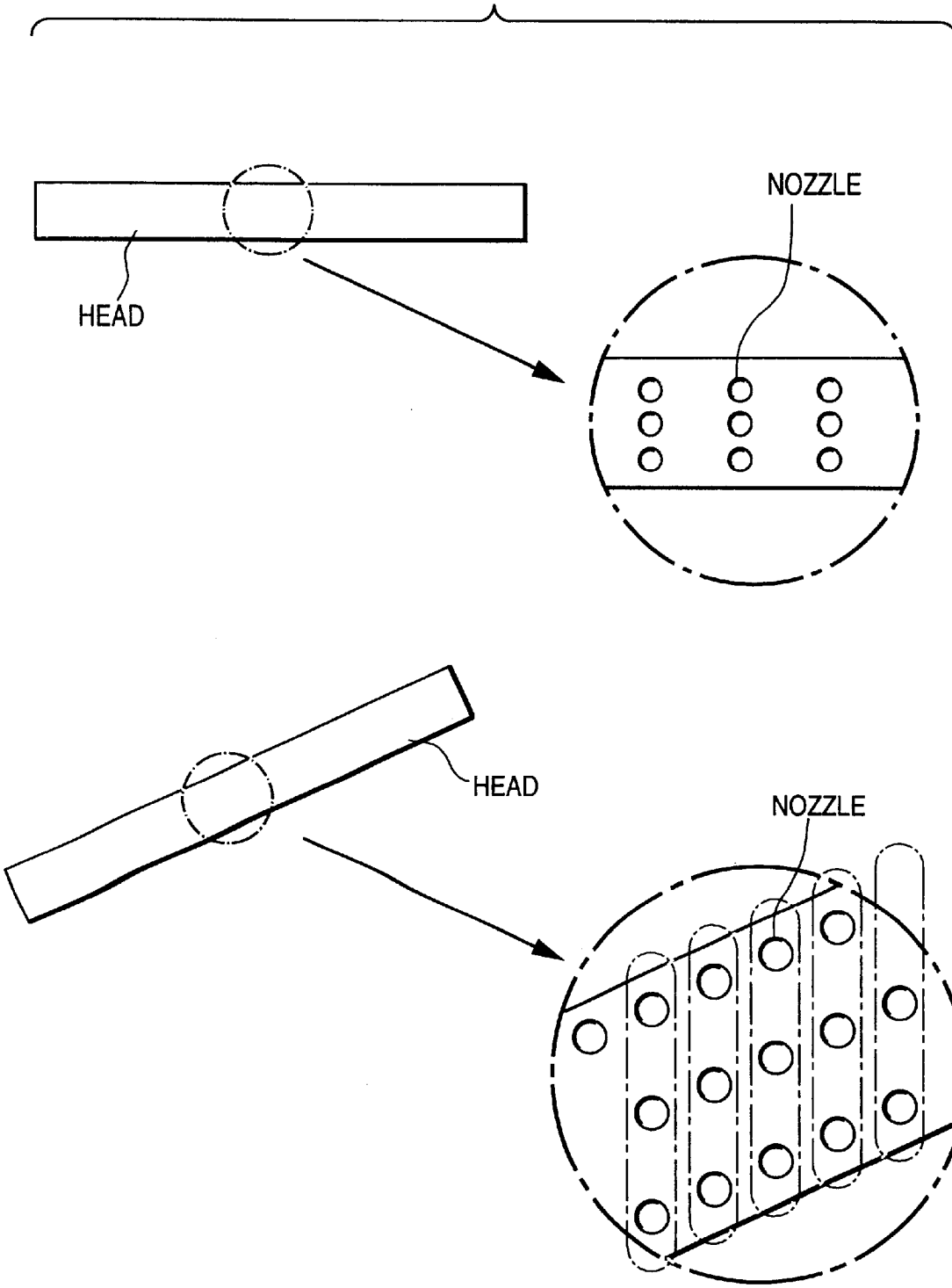
FIG. 17 is a view showing an example of an ink-jet head designed to color the pixels on each line with a plurality of nozzles in one scanning operation.

The present invention can also be applied to a case in which a color filter is colored by using a head unit having R (red) ink-jet heads, G (green) ink-jet heads, and B (blue) ink-jet heads. This embodiment uses an ink-jet head unit 55 having three red heads, three green heads, and three blue heads, as shown in FIG. 16. Each pixel array is preferably colored by a plurality of (three heads are used for each color in this case, but any number of heads will do) different nozzles for the reason described above in the first embodiment. Assume that the head unit 55 having the structure shown in FIG. 16 is used. In this case, when the heads are relatively scanned over the substrate once, each pixel array is colored with inks discharged from three different nozzles (three heads of the same color one by one) The same applies to a case in which an ink-jet head having a plurality of nozzles arranged along the pixel array direction is scanned once to color pixels with inks discharged from the nozzles.

To correct the differences between the amounts of inks landed onto the respective pixel arrays, line patterns are formed by using the head unit 55 having the above structure. A specific combination of nozzles of a specific head of the head unit which is to be used to color each of these line patterns is determined in advance, and each of such combinations of nozzles is set in advance as a combination of nozzles to be used to color each pixel array of a color filter.

The line patterns drawn, as shown in FIG. 9, by combining a plurality of nozzles of a plurality of heads in this manner are sensed by a line sensor camera 502 with a transmission light source 501 being set to a proper intensity, as shown in FIG. 13. The resultant image is input to an image processing apparatus 505. The image becomes patterns each having a luminance level corresponding to the intensity of the input light. The image processing apparatus 505 then calculates the absorbance of each line pattern, thus obtaining the absorbances of all the line patterns.

Figure 18:
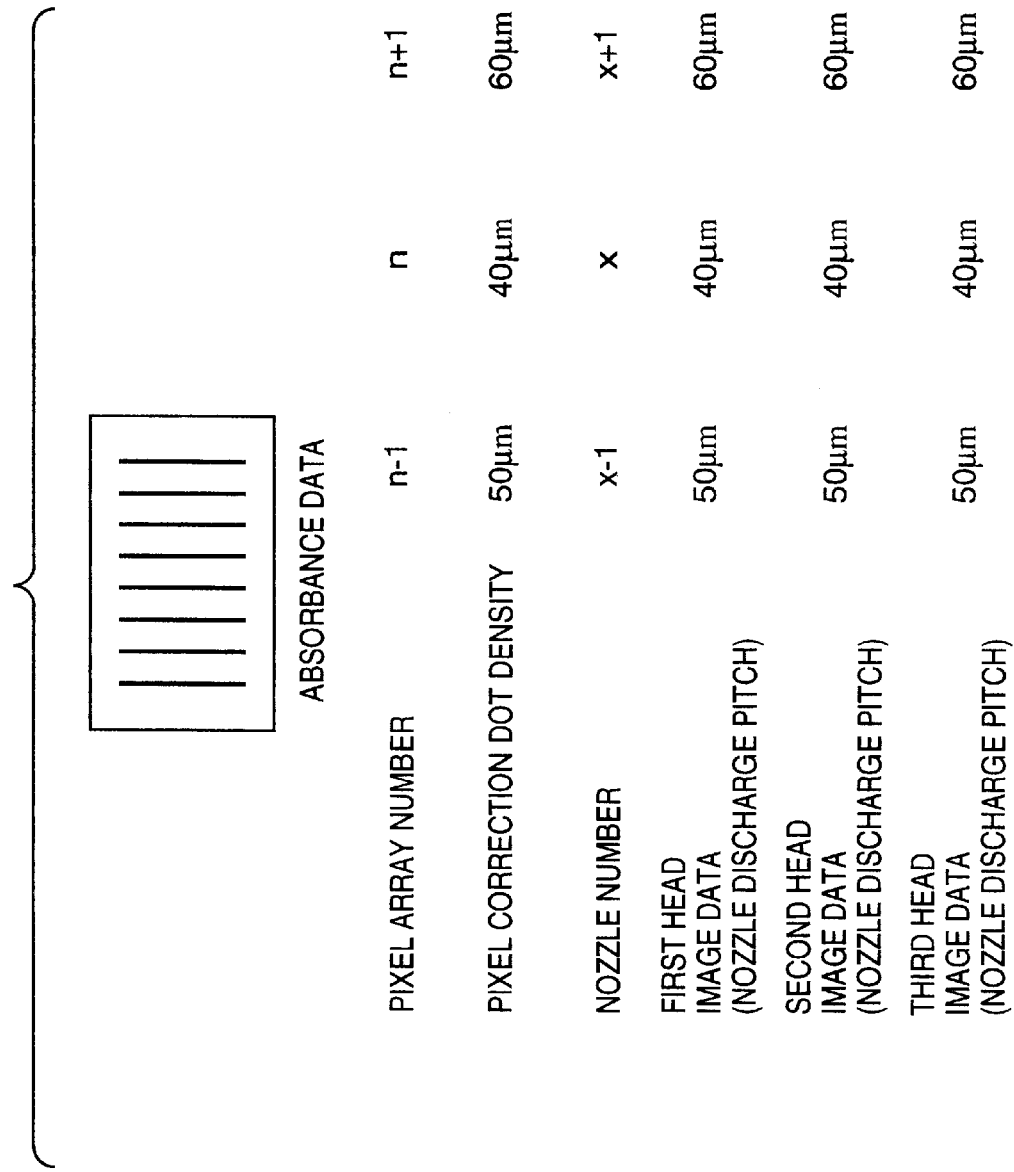
FIG. 18 is a view showing the discharge pitches for the respective pixels and the correction image discharge pitches which are obtained from the absorbances of line patterns.

The discharge densities of inks to be landed onto the respective pixels are determined by the method of the first embodiment. In general, when ink discharge densities are to be adjusted, an ink discharge pitch must be set for each head. In the method of this embodiment, however, ink discharge pitches are set for a plurality of heads by using correction image data with the same ink discharge pitch. FIG. 18 shows the line pattern measurement data, the respective data, and the ink discharge pitches of the respective heads. Since the correction image data for the respective heads are identical to each other, only one correction image data is required.

Various changes and modifications of the above embodiments can be made without departing from the spirit and scope of the invention.

In the above embodiments, the color densities of drawn line patterns are measured by measuring the absorbances of the line patterns. However, the present invention is not limited to this. The color densities of the drawn patterns may be detected by measuring the transmittances or reflectances of the patterns.

In the above embodiments, the color densities of the line patterns drawn on the glass substrate are measured. As is obvious, however, discharge pitches can be set in the same manner as described above even when the color density of a color filter substrate is to be measured.

According to the above description, the present invention is applied to the print apparatus of the system, among various ink-jet recording systems, which has a means (e.g., an electrothermal converter or laser light) for generating heat energy as energy used to discharge an ink, and changes the state of an ink by using the heat energy. According to this system, a high-density, high-definition recording operation can be realized.

As for the typical structure and principle, it is preferable that the basic structure disclosed in, for example, U.S. Pat. Nos. 4,723,129 or 4,740,796 is employed. The above method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electrothermal converter disposed to face a sheet or a fluid passage which holds the fluid (ink) to a level higher than levels at which film boiling takes place are applied to the electrothermal converter in accordance with recording information so as to generate heat energy in the electrothermal converter and to cause the heat effecting surface of the recording head to take place film boiling so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. Nos. 4,463,359 or 4,345,262 is employed. If conditions disclosed in U.S. Pat. No. 4,313,124 which is an invention relating to the temperature rising ratio at the heat effecting surface are employed, a satisfactory recording result can be obtained.

As an alternative to the structure (linear fluid passage or perpendicular fluid passage) of the recording head disclosed in each of the above inventions and having an arrangement that discharge ports, fluid passages and electrothermal converters are combined, a structure having an arrangement that the heat effecting surface is disposed in a bent region and disclosed in U.S. Pat. Nos. 4,558,333 or 4,459,600 may be employed. In addition, the following structures maybe employed: a structure having an arrangement that a common slit is formed to serve as a discharge section of a plurality of electrothermal converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a recording head of the full line type having a length corresponding to the maximum width of a recording medium which can be recorded by the recording apparatus, either the construction which satisfies its length by a combination of a plurality of recording heads as disclosed in the above specifications or the construction as a single full line type recording head which has integrally been formed can be used.

In addition, the invention is effective for a recording head of the freely exchangeable chip type which enables electrical connection to the recording apparatus main body or supply of ink from the main device by being mounted onto the apparatus main body, or for the case by use of a recording head of the cartridge type provided integrally on the recording head itself.

It is preferred to additionally employ the recording head restoring means and the auxiliary means provided as the component of the present invention because the effect of the present invention can be further stabled. Specifically, it is preferable to employ a recording head capping means, a cleaning means, a pressurizing or suction means, an electrothermal converter, an another heating element or a sub-heating means constituted by combining them and a sub-emitting mode in which an emitting is performed independently from the recording emitting in order to stably perform the recording operation.

Although a fluid ink is employed in the above embodiments of the present invention, an ink which is solidified at the room temperature or lower, or an ink which is softened or liquified at the room temperature may be used. That is, any ink which is liquified when a recording signal is supplied may be used.

Furthermore, an ink which is solidified when it is caused to stand, and liquified when heat energy is supplied in accordance with a recording signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a recording signal so as to be discharged in the form of fluid ink, or an ink which is liquified only after heat energy is supplied, e.g., an ink which starts to solidify when it reaches a recording medium, can be adapted to the present invention. In the above case, the ink may be of a type which is held as fluid or solid material in a recess of a porous sheet or a through hole at a position to face the electrothermal converter as disclosed in Japanese Patent Laid-Open No. 54-56847 or Japanese Patent Laid-Open No. 60-71260. It is the most preferred way for the ink to be adapted to the above film boiling method.

As has been described above, according to the present invention, line patterns are drawn by a plurality of combinations of nozzles to be used to actually color the pixels of a color filter, and ink discharge densities are determined from the color densities of the line patterns, thereby accurately determining ink discharge densities in a short process.

In addition, n heads are arranged along the pixel array direction, and correction image data is formed by using the heads. This method can improve the quality of a color filter without changing a coloring process, reduce the number of image data to be used to 1/n, and shorten the coloring time to 1/n as compared with a case in which the method of the present invention is not used.

The present invention is not limited to the above embodiments and various changes and modifications can be made within the spirit and scope of the present invention. Therefore, to apprise the public of the scope of the present invention the following claims are made.

What is claimed is:

1. A method of setting ink discharge density for coloring one line of a colored portion of a color filter, said one line being colored by a plurality of inks discharged from a plurality of ink discharge nozzles with a common ink discharge density, said method comprising the steps of:

forming the colored portion extended along a scanning direction by relatively scanning the plurality of ink discharge nozzles and a substrate, and discharging inks on the substrate with a common first ink discharge density from each of the plurality of ink discharge nozzles, said one line of the colored portion being formed by the plurality of ink discharge nozzles;

detecting a color density Dn of the colored portion after said forming step; and setting a common second ink discharge density by changing the common first ink discharge density into the common second ink discharge density, which is the same on each of the plurality of ink discharge nozzles, on the basis of the color density Dn detected in said detecting step so that a color density of the colored portion becomes a target color density D.

2. The method according to claim 1, wherein the setting step comprises setting and calculating the common second ink discharge density according to the common second ink discharge density x Kn+bn=D where Kn and bn are constants.

3. The method according to claim 2, further comprising a calibrating step of discharging inks from said plurality of ink discharge nozzles at different ink discharge densities to form a plurality of colored portions on a substrate at different ink discharge densities, obtaining a straight line representing a relationship between color densities of the plurality of colored portions and the ink discharge densities, and obtaining the constants Kn and bn from the straight line.

4. The method according to claim 3, wherein the constant Kn represents a slope of the straight line, and the constant bn represents a y segment of the straight line.

5. The method according to claim 1, wherein the forming step comprises forming the colored portion of said one line by performing a plurality of scanning operations while changing an ink discharging nozzle used for each scanning operation.

6. The method according to claim 1, wherein said color filter has multiple ones of said one line of the colored portions, and said setting step is performed at substantially the same time for each of the multiple lines of the colored portions.

7. The method according to claim 1, wherein said forming step comprises forming the colored portion of said one line by performing one scanning operation while discharging inks from said plurality of ink discharging nozzles.

8. The method according to claim 1, wherein the substrate is a glass substrate.

9. The method according to claim 8, wherein the glass substrate has a black matrix formed thereon.

10. The method according to claim 1, wherein the detecting step comprises detecting the color density Dn of the colored portion by measuring an absorbance of the colored portion.

11. The method according to claim 1, wherein the detecting step comprises detecting the color density Dn of the colored portion by measuring a transmittance of the colored portion.

12. The method according to claim 1, wherein the detecting step comprises detecting the color density Dn of the colored portion by measuring a reflectance of the colored portion.

13. The method according to claim 1, wherein said plurality of ink discharge nozzles is comprised of an ink-jet head for discharging ink by using heat energy, said head having a heat energy generator for generating heat energy applied to the ink.

14. A method according to claim 1, further comprising the step of coloring the substrate by discharging ink from said plurality of ink discharge nozzles at the common second ink discharge density set in the setting step.

15. The method according to claim 14, wherein said plurality of ink discharge nozzles is comprised of an ink-jet head for discharging ink by using heat energy, said head having a heat energy generator for generating heat energy applied to the ink.

16. A display device integrally comprising:

a color filter having at least one line of a colored portion and being manufactured by relatively scanning a head unit and a color filter substrate and discharging inks from plural discharge nozzles of said head unit onto the color filter substrate, said color filter further being manufactured by forming the colored portion extended along a scanning direction by relatively scanning the plurality of ink discharge nozzles and a substrate, and discharging inks on the substrate with a common first ink discharge density from each of the plurality of ink discharge nozzles, said one line of the colored portion being formed by the plurality of ink discharge nozzles, by detecting a color density Dn of the colored portion after said forming step, and by setting a common second ink discharge density by changing the common first ink discharge density into the common second ink discharge density, which is the same on each of the plurality of ink discharge nozzles, on the basis of the color density Dn detected in said detecting step so that a color density of the colored portion becomes a target color density D; and light amount changing means for changing a light amount.

17. An apparatus comprising:

a display device integrally including a color filter having at least one line of a colored portion and being manufactured by relatively scanning a head unit and a color filter substrate and discharging inks from plural discharge nozzles of said head unit onto the color filter substrate, said color filter further being manufactured by forming the colored portion extended along a scanning direction by relatively scanning the plurality of ink discharge nozzles and a substrate, and discharging inks on the substrate with a common first ink discharge density from each of the plurality of ink discharge nozzles, said one line of the colored portion being formed by the plurality of ink discharge nozzles, by detecting a color density Dn of the colored portion after said forming step, and by setting a common second ink discharge density by changing the common first ink discharge density into the common second ink discharge density, which is the same on each of the plurality of ink discharge nozzles, on the basis of the color density Dn detected in said detecting step so that a color density of the colored portion becomes a target color density D, and light amount changing means for changing a light amount; and image signal supply means for supplying an image signal to said display device.

18. The method according to claim 1, wherein the common second ink discharge density is set to larger than the common first ink discharge density when the color density Dn is smaller than the color density D, and the common second ink discharge density is set to smaller than the common first ink discharge density when the color density Dn is larger than the color density D.

19. The method according to claim 1, wherein a position at which a plurality of inks discharged with the common first ink discharge density are applied is different along the scanning direction for each of the plurality of ink discharge nozzles.

* * * * *